(12) United States Patent
Honda et al.

(10) Patent No.: US 9,077,040 B2
(45) Date of Patent: Jul. 7, 2015

(54) COLLECTOR HAVING MULTIPLE RESIN LAYERS FOR BIPOLAR LITHIUM ION SECONDARY BATTERY

(75) Inventors: Takashi Honda, Yokosuka (JP); Yasuyuki Tanaka, Yokohama (JP); Shigeo Ibuka, Ebina (JP); Satoru Ichikawa, Yokosuka (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 722 days.

(21) Appl. No.: 13/395,565

(22) PCT Filed: Dec. 6, 2010

(86) PCT No.: PCT/JP2010/071825
§ 371 (c)(1),
(2), (4) Date: Apr. 9, 2012

(87) PCT Pub. No.: WO2011/092938
PCT Pub. Date: Aug. 4, 2011

(65) Prior Publication Data
US 2012/0189912 A1    Jul. 26, 2012

(30) Foreign Application Priority Data
Jan. 29, 2010   (JP) .................................. 2010-018722

(51) Int. Cl.
  *H01M 4/66*      (2006.01)
  *H01M 10/04*     (2006.01)
  *H01M 10/0585*   (2010.01)
  *H01M 10/0525*   (2010.01)

(52) U.S. Cl.
  CPC .............. *H01M 4/667* (2013.01); *H01M 4/666* (2013.01); *H01M 4/668* (2013.01); *H01M 10/0418* (2013.01); *H01M 10/0585* (2013.01); *Y02T 10/7011* (2013.01); *H01M 10/0525* (2013.01)

(58) Field of Classification Search
  CPC ....... H01M 4/64; H01M 4/668; H01M 4/667; H01M 4/666
  See application file for complete search history.

(56) References Cited

U.S. PATENT DOCUMENTS

| 6,280,873 | B1 | 8/2001 | Tsukamoto |
| 2008/0220330 | A1 | 9/2008 | Hosaka et al. |

FOREIGN PATENT DOCUMENTS

| JP | 2004-164897 A | 6/2004 |
| JP | 2006-185854 A | 7/2006 |
| JP | 2006-190649 A | 7/2006 |
| JP | 2006185854 A * | 7/2006 |
| JP | 2006-302616 A | 11/2006 |
| JP | 2007-329004 A | 12/2007 |
| JP | 2010146901 A * | 7/2010 |

OTHER PUBLICATIONS

Extended European Search Report, Jul. 31, 2013, 4 pages.

\* cited by examiner

*Primary Examiner* — Zachary Best
(74) *Attorney, Agent, or Firm* — Foley & Lardner LLP

(57) ABSTRACT

To provide a method that is capable of suppressing absorption of lithium ions into the inner portion of a resin collector that is used in a bipolar lithium ion secondary battery. The collector for a bipolar lithium ion secondary battery of the invention has at least two conductive layers. One of the conductive layers that constitute the collector (a first conductive layer) is configured by adding a conductive filler into a base material that contains an imide group-containing resin. The other of the conductive layers that constitute the collector (a second conductive layer) is configured by adding a conductive filler into a base material that contains a polar resin containing no imide group. The collector for a bipolar lithium ion secondary battery is further characterized in that when a bipolar electrode is formed, the first conductive layer is arranged on the positive electrode side.

6 Claims, 2 Drawing Sheets

COLLECTOR HAVING MULTIPLE RESIN LAYERS FOR BIPOLAR LITHIUM ION SECONDARY BATTERY

TECHNICAL FIELD

The present invention relates to a collector for a bipolar lithium ion secondary battery, and a bipolar electrode for a lithium ion secondary battery and a bipolar lithium ion secondary battery using the collector.

BACKGROUND ART

From the viewpoint of an influence on environment or fuel efficiency, a hybrid electric vehicle (HEV), an electric vehicle (EV), and a fuel cell vehicle has been manufactured and sold in recent days, and new models has been continuously developed. For the so-called electromotive vehicles, use of a power supply device that can be discharged and charged is essential. As the power supply device, a secondary battery like a lithium ion battery and a nickel hydrogen battery, an electric double layer capacitor, or the like is used. In particular, having high energy density and high durability against repeated charge and discharge, the lithium ion secondary battery is believed to be suitable for an electromotive vehicle and efforts are made to develop their various types. However, to apply it to a motor driving power supply of various vehicles, it is necessary to use plural secondary batteries connected in series to guarantee a large output.

However, when a battery is connected through a connection section, an output is lowered by electric resistance of the connection section. Further, a battery with a connection section is spatially disadvantageous. Specifically, output density or energy density of a battery degrades by a connection section.

For solving those problems, a bipolar secondary battery like a bipolar lithium ion secondary battery is developed. The bipolar secondary battery has an electric power generating element having plural bipolar electrodes laminated therein and intervened by an electrolyte layer or a separator, in which a positive electrode active material layer is formed on one side of a collector and a negative electrode active material layer is formed on the other side of a collector.

To guarantee higher output density, the collector used for the bipolar secondary battery is preferably made of a light-weight material having excellent conductivity. From such point of view, a collector composed of a polymer material added with conductive materials (i.e., a resin collector) is suggested to replace conventionally used metal foils. For example, in Patent Literature 1, a resin collector composed of a polymer material in which metal particles or carbon particles are added as a conductive material is disclosed.

PRIOR ART DOCUMENT

Patent Literature

Patent Literature 1: Japanese Patent Application Laid-Open (JP-A) No. 2006-190649

DISCLOSURE OF INVENTION

Problem to be Solved by the Invention

Meanwhile, compared to a metal foil collector, the resin collector as disclosed in Patent Literature 1 has a less favorable blocking for lithium ions that are contained in an electrolyte liquid. For such reasons, it is found that, when it is applied for a bipolar lithium ion secondary battery, lithium ions penetrate an inner portion of a resin collector which constitutes a bipolar electrode and the ions are maintained in absorbed state in the inner portion of the collector. Since the absorbed lithium ions are not easily released from the inner portion of a collector, the battery capacity would be reduced consequently in some case.

The resin for constituting a resin collector is preferably a resin that is hardly deformed by a heat or pressure treatment during battery fabrication and has excellent heat resistance, strength, and solvent resistance so as not to easily dissolve in a solvent of an electrolyte liquid. As a resin having such properties, an imide group-containing resin like polyimide is very preferable. However, it is also found that the lithium ion absorption into the inner portion of a collector is particularly significant when an imide group-containing resin is used.

Under the circumstances, the object of the invention is to provide a method capable of suppressing absorption of lithium ions into the inner portion of resin collector which contains an imide group-containing resin and is used in a bipolar lithium ion secondary battery.

Means for Solving Problem

The inventors of the invention carried out intensive studies for solving the problems described above. During the course of the studies, they clarified a mechanism of lithium ion absorption into a resin collector, and the invention is completed based on the finding.

Specifically, the collector for a bipolar lithium ion secondary battery of the invention has at least two conductive layers. One of the conductive layers that constitutes the collector (in the specification, referred to as a "first conductive layer") is configured by adding a conductive filler into a base that contains an imide group-containing resin. The other of the conductive layers that also constitutes the collector (in the specification, referred to as a "second conductive layer") is configured by adding a conductive filler into a base that contains a polar resin containing no imide group. Further, when a bipolar electrode is formed, the first conductive layer is arranged on the positive electrode side.

Effect of the Invention

According to the invention, when energy level of the highest occupied molecular orbital (HOMO) of a conductive resin layer having conductivity (i.e., conductive layer) arranged on a negative electrode side of a bipolar electrode increases by negative electrode potential, the increased level is suppressed not to be higher than the oxidation reduction potential of lithium ions in an electrolyte liquid. As a result, penetration and absorption of the lithium ions into the inner portion of a resin collector are prevented.

MODE(S) FOR CARRYING OUT THE INVENTION

Figure 1:
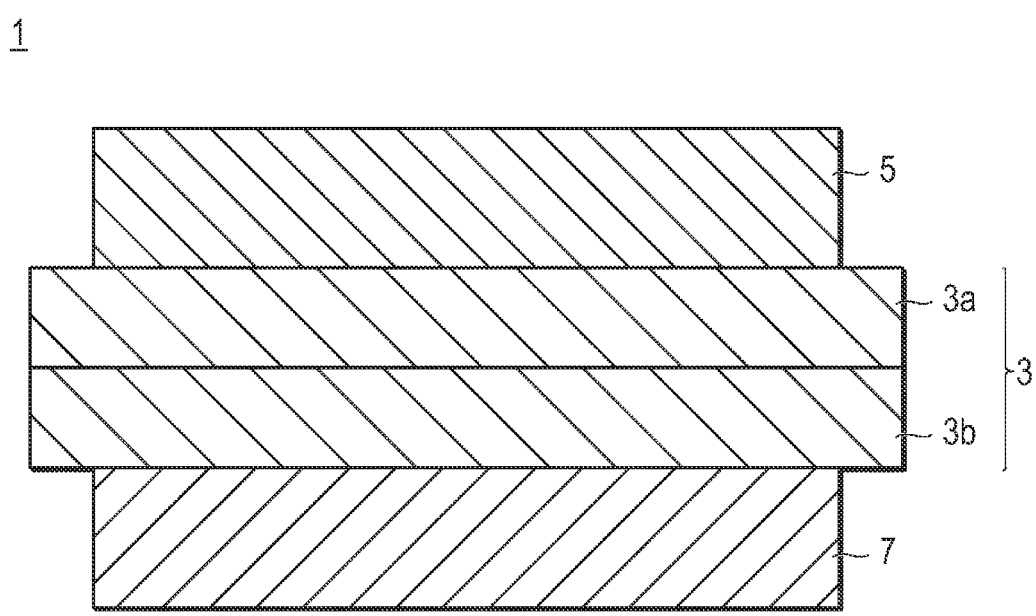
FIG. 1 is a cross-sectional view schematically illustrating the whole structure of a bipolar electrode for a lithium ion secondary battery, in which the collector for a bipolar lithium ion secondary battery according to an embodiment of the invention is used.

Herein below, preferred embodiments of the invention are described in view of the drawings. However, as the technical scope of the invention should be determined based on the descriptions of the claims, it is not limited to the following aspects. Further, for explanation of the drawings, the same symbols are given to the same elements and explanation is not repeated. Further, dimension ratio is exaggerated in the drawings for the sake of description, and it may be different from the real ratio. Herein below, a resin layer having conductivity may be simply referred to as a "resin layer", a collector for a bipolar lithium ion secondary battery may be simply referred to as a "collector", and a bipolar electrode for a lithium ion secondary battery may be simply referred to as a "bipolar electrode".

<Collector and Bipolar Electrode>

FIG. 1 is a cross-sectional view which schematically illustrates the whole structure of a bipolar electrode for a lithium ion secondary battery, in which the collector for a bipolar lithium ion secondary battery according to an embodiment of the invention is used. The bipolar electrode 1 according to the embodiment of the invention as illustrated in FIG. 1 has a laminate structure in which a positive electrode active material layer 5 is formed on one surface of a collector 3 and a negative electrode active material layer 7 is formed on the other surface of the collector. The collector 3 has a bilayer structure in which a first conductive layer 3a arranged on the positive electrode active material layer 5 side and a second conductive layer 3b arranged on the negative electrode active material layer 7 side are laminated on each other.

Herein, the first conductive layer 3a is configured by adding about 10% by mass of Ketjen Black as a conductive filler to a base material comprising polyimide (PI), for example. Further, the second conductive layer 3b is configured by adding the same conductive filler to a base material comprising an ethylene-vinyl alcohol copolymer (EVOH), for example. Further, the positive electrode active material layer 5 contains $LiMn_2O_4$ (not illustrated) as a positive electrode active material, for example, and the negative electrode active material layer 7 contains hard carbon (not illustrated) as a negative electrode active material, for example. Herein below, main constitutional elements of the collector 3 and the bipolar electrode 1 of the embodiment are described.

[Collector]

The collector 3 has a function of mediating the transfer of electrons from one surface on which the positive electrode active material layer is formed to the other surface on which the negative electrode active material layer is formed.

According to the embodiment, the collector 3 has two conductive layers (3a and 3b). Herein, the conductive layer (a first conductive layer) 3a that is arranged on the positive electrode active material layer 5 side of the bipolar electrode 1 is configured by adding a conductive filler into a base material which contains an imide group-containing resin. Depending on specific case, it may contain additional additives. By having this constitution, it has a function of an electron transporting medium and it can also contribute to a lightweight collector.

A base material for the first conductive layer 3a essentially contains an imide group-containing resin. Since the imide group-containing resin has excellent heat resistance, strength, and solvent resistance, when it is used as a base material of a collector, a collector which hardly undergoes any deformation under a heat or pressure treatment during battery fabrication and hardly dissolves in a solvent of an electrolyte liquid can be obtained. Examples of the imide group-containing resin include, in addition to polyimide (PI), polyamide imide (PAI) and polyether imide (PEI). Of these, as an imide group-containing resin, polyimide (PI) is preferably used. The imide group-containing resin may be used either singly or in combination of two or more kinds thereof.

The base material for constituting the first conductive layer 3a may contain a conventionally known non-conductive polymer material or conductive polymer material in addition to the imide group-containing resin. Examples of the non-conductive polymer material include polyethylene (PE; high density polyethylene (HDPE), low density polyethylene (LDPE)), polypropylene (PP), polyethylene terephthalate (PET), polybutylene terephthalate (PBT), polyether nitrile (PEN), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). Examples of the conductive polymer material include polyaniline, polypyrrole, polythiophene, polyacetylene, polyparaphenylene, polyphenylene vinylene, polyacrylonitrile, and polyoxadiazole. The non-conductive polymer material or conductive polymer material may be used either singly or in combination of two or more kinds thereof.

In the polymer materials (resin) for the base material, the addition amount of the imide group-containing resin in a corresponding base material can be decided from the viewpoint of obtaining better working effect of the embodiment. Specifically, the addition amount of the imide group-containing resin (more preferably, polyimide (PI)) is preferably 50% by mass or more, more preferably 70% by mass or more, still more preferably 90% by mass or more, even still more preferably 95% by mass or more, and most preferably 100% by mass in the 100% by mass of the resin which constitutes a base materiel.

Examples of the conductive filler to be added to a base material for the first conductive layer 3a include, although not specifically limited, conductive carbon, tin (Sn), and lithium titanate ($Li_4Ti_5O_{12}$). It is preferable that the conductive carbon contains at least one selected from a group consisting of acetylene black, Vulcan, black pearl, carbon nanofibers, Ketjen Black, carbon nanotubes, carbon nanohorn, carbon nanobaloon, and fullerene. Those conductive carbons have a very large potential window to be stable in a wide range of positive and negative potentials and illustrate excellent electrical conductivity. Among them, it is preferable to contain at least one selected from a group consisting of carbon nanotubes, carbon nanohorn, Ketjen Black, carbon nanobaloon, and fullerene. Since the conductive carbon has a hollow structure, surface area per mass is large and it can be used to further reduce the weight of a collector. Meanwhile, at least one metal selected from a group consisting of Ni, Al, Cu, Pt, Fe, Cr, Zn, In, Sb, and K, an alloy containing the metal, or metal oxides thereof may be also used as a conductive filler. Those metals are resistant against the potential of a positive electrode or a negative electrode, which is formed on surface of a collector. For example, Al is resistant against the potential of a positive electrode, Ni and Cu are resistant against the potential of a negative electrode, and Pt is resistant against both electrodes. Among them, an alloy containing at least one metal selected from a group of Ni, Al, Cu, Pt, Fe, and Cr is more preferable. Specific examples of the alloy include stainless steel (SUS), INCONEL (registered trade mark), HASTELLOY (registered trade mark), other Fe—Cr based alloys, and Ni—Cr based alloys. By using those alloys, even higher potential resistance can be obtained. In addition, the conductive filler may be used either singly or in combination of two or more kinds thereof.

Shape of the conductive filler is not specifically limited. It can be appropriately selected from known shapes including particle shape, fiber shape, plate shape, bulk shape, fabric shape, and mesh shape. When it is desired to provide widely an electrical conductivity to a resin, it is preferable to use a particle shape conductive filler. Meanwhile, when it is desired to increase an electrical conductivity in a specific direction, a conductive filler which has a certain direction in the shape like a fiber shape is preferably used.

Size of the conductive filler is not specifically limited. Depending on size and thickness of a conductive layer and shape of a conductive filler, a filler with various size can be used. When the conductive filler has a particle shape, for example, the average particle diameter is preferably equal to or more from 0.1 and equal to or less 10 μm or so from the viewpoint of easy molding of the conductive layer. In addition, as used herein, the term "particle diameter" refers to a maximum distance L among distances of any two points on the contour of a conductive filler particle. The term "average particle diameter" refers to an average of the particle diameters of conductive filler particles observed in several to several ten fields by an observation means such as scanning electron microscope (SEM) or transmission electron microscope (TEM). The same definitions apply to the particle diameter and average particle diameter of the active materials as will be mentioned later.

The amount of the conductive filler contained in the conductive layer 3a is not specifically limited either. However, with respect to the whole mass of the base material, the amount of the conductive filler is preferably 5 to 35% by mass, more preferably 5 to 25% by mass, and more preferably 5 to 15% by mass. By adding the conductive filler in such amount to the base material, a base material can be provided with a sufficient electrical conductivity while mass increase of the conductive layer 3a is suppressed.

The dispersion state of the conductive filler in the conductive layer 3a is not specifically limited. It may be homogeneously dispersed in a resin as a base material or locally dispersed in limited part of a resin.

In the conductive layer (a second conductive layer) 3b arranged on negative electrode active material layer 7 side of the bipolar electrode 1, a conductive filler is added to a base material which contains a polar resin containing no imide group.

In the second conductive layer 3b, the base material contains a polar resin containing no imide group. In the present embodiment, the base material contains a polar resin containing no imide group contributes to suppression of the penetration and absorption of lithium ions into the collector 3. As used herein, the expression that the resin containing no imide group is "polar" means that the corresponding resin has polarity as a whole. In such case, the resin containing no imide group has a polar group or a derivative thereof, for example. The term "polar group" means a group of atoms having polarity. Further, the term "derivative of a polar group" means the "polar group" which is modified without significant change of the mother skeleton by introducing a further functional group or substituting atoms into the above-mentioned "polar group". Thus, the resin containing no imide group, which constitutes the second conductive layer 3b, itself can have a polarity by the polar group or derivative group is incorporated thereinto. Examples of the polar group which can be used for providing the resin containing no imide group with a polar property include a hydroxy group, an amide group, a sulfide group, a halogen atom such as a fluorine atom, an ether group, and an amino group, but not limited thereto. Since the polar resin containing no imide group has a strong intermolecular force in the resins (i.e., ionic interaction, hydrogen bond, or the like), it can prevent the penetration of lithium ions into the inner portion of the collectors 3.

The resin containing no imide group may be either crystalline or non-crystalline. From the viewpoint of obtaining more efficient suppression of the penetration and absorption of lithium ions into the inner portion of the collectors 3, the resin containing no imide group is preferably crystalline. The reason is that, since the crystalline resin containing no imide group has a greater number of chemical bonds (e.g., a covalent bond, an ionic bond, a hydrogen bond, and a van der Waals bond) per unit volume compared to the non-crystalline resin containing no imide group, it is more difficult for the lithium ions to penetrate it. In the present specification, the expression that the resin containing no imide group is "crystalline" means that the corresponding resin containing no imide group is a crystalline polymer. In addition, the term "crystalline polymer" indicates a polymer that can crystallize at least in its part.

Examples of the crystalline resin containing no imide group include polyethylene, polypropylene, an ionomer, polyethylene terephthalate, polyamide, polyacetal, polybutylene terephthalate, polyethylene with ultra high molecular weight, polyphenylene sulfide, polyether ether ketone, polytetrafluoroethylene, and a copolymer thereof.

Examples of the non-crystalline resin containing no imide group include polystyrene, rubber reinforced polystyrene, acrylonitrile-styrene copolymer, acrylonitrile-butadiene-styrene copolymer, styrene-methyl acrylate copolymer, styrene-methyl methacrylate-butadiene copolymer, polycarbonate, polymethyl acrylate, polymethyl methacrylate, polylactate, polyvinyl chloride, polyvinylidene chloride, vinyl chloride-ethylene copolymer, vinyl chloride-vinyl acetate copolymer, styrene-isoprene-styrene copolymer, styrene-ethylene/butyrene-styrene copolymer, polybutadiene, polyisoprene, polychloroprene, styrene-butadiene copolymer, ethylene-α-olefine copolymer, ethylene-propylene-diene copolymer, cycloolefine, ethylene tetracyclododecene copolymer, polysulfone, polyether sulfone, polyphenylene oxide, polyvinyl acetate, polyphenylene ether, and a liquid crystalline polymer.

Specific examples of the resin containing no imide group which can be used for the second conductive layer 3b include ethylene-vinyl alcohol copolymer (EVOH) having a hydroxy group, polyamide (PA) such as Nylon (registered trademark) 12 having an amide group, polyphenylene sulfide (PPS) having a sulfide group, tetrafluoroethylene-hexafluoropropylene copolymer (FEP) and tetrafluoroethylene-perfluoroalkyl vinyl ether copolymer having a fluorine atom, polyether ether ketone (PEEK), polyether ketone (PEK), and an epoxy resin having an ether group, and a melamine resin having an amino group, but not limited thereto. Of these, from the viewpoint of obtaining better working effect of the embodiment, EVOH is preferably used. The ethylene composition in EVOH is, although not specifically limited, preferably 10 to 60 mol %, more preferably 20 to 55 mol %, and still more preferably 30 to 45 mol %, considering fusibility or the like during manufacturing.

The base material for the second conductive layer 3b may further contain, in addition to the resin containing no imide group described above, a conventionally known non-conductive polymer material or conductive polymer material that are described above in relation to the first conductive layer 3a.

However, in the polymer materials (resin) for constituting the base material, the addition amount of the resin containing no imide group in the base material may be decided from the viewpoint of obtaining better working effect of the embodiment. Specifically, the addition amount of the resin containing no imide group with respect to 100% by mass of the resin for the base material is preferably 50% by mass or more, more preferably 70% by mass or more, still more preferably 90% by mass or more, even still more preferably 95% by mass or more, and most preferably 100% by mass. Further, from the viewpoint of obtaining better exhibition of the working effect of the embodiment, the addition amount of the imide group-containing resin in the second conductive layer 3b can be also decided. Specifically, the addition amount of the imide group-containing resin with respect to 100% by mass of the resin for the base material is preferably 50% by mass or less, more preferably 30% by mass or less, still more preferably 10% by mass or less, even still more preferably 5% by mass or less, and most preferably 0% by mass (i.e., the imide group-containing resin is not contained).

When the second conductive layer 3b is according to the embodiment (1), the second conductive layer 3b is configured by adding a conductive filler into a base material which is composed of the resin described above. Regarding the specific examples of the conductive filler used therefor, the same types as those described above as a constitutional material for the first conductive layer can be also used, and therefore detailed descriptions are not repeated.

As long as it contains at least one layer for each of the first conductive layer 3a (relatively arranged on a positive electrode side) and the second conductive layer 3b (relatively arranged on a negative electrode side) which satisfies the definition, any collector is within the technical scope of the invention. The embodiment of the collector is not limited to the one illustrated in the drawings and it may have various embodiments. For example, the collector may be a laminate in which an additional layer is contained in addition to the layers described above, if necessary. Examples of the additional layer include a metal layer and an adhesive layer, but not limited thereto.

Further, when plural conductive layers containing the resin are laminated for producing the collector 3 of the embodiment, the plural conductive layers can be adhered by heat sealing. Examples of a method for laminating a conductive layer containing the resin and a metal layer include a metal deposition (e.g., plating and sputtering) on a conductive layer and a method of melting and applying the resin on a metal foil. From the viewpoint of lowering contact resistance at an interface of neighboring layers or preventing peeling of an adhered face, two layers may be adhered on each other through an adhesion layer. Examples of the material used for the adhesion layer include conductive paste based on metal oxides such as zinc oxide, indium oxide, and titanium oxide; and conductive paste based on carbon such as carbon black, carbon nanotubes, and graphite.

Thickness of the collector is preferably low from the viewpoint of increasing output density of a battery by weight reduction. It is tolerate for a bipolar secondary battery that the collector present between a positive electrode active material layer and a negative electrode active material layer of a bipolar electrode has high electric resistance in the horizontal direction of the lamination, then, the thickness of the collector can be reduced. Specifically, the lower limit of the thickness of the collector 3 is preferably 10 μm or more, more preferably 20 μm or more, and still more preferably 30 μm or more. Further, the upper limit of the collector 3 is preferably 200 μm or less, more preferably 100 μm or less, and still more preferably 80 μm or less. By having such thickness, a lightweight and also sufficient mechanical strength can be obtained. Thickness of each of the first conductive layer 3a and the second conductive layer 3b is not specifically limited, either. Specifically, the lower limit of the thickness of each of the first conductive layer 3a and the second conductive layer 3b is preferably 5 μm or more, more preferably 7 μm or more, and still more preferably 10 μm or more. Further, the upper limit of each of the first conductive layer 3a and the second conductive layer 3b is preferably 100 μm or less, more 50 μm or less, and still more preferably 40 μm or less. The ratio of the thickness of the first conductive layer 3a and the thickness of the second conductive layer 3b is not specifically limited, either. In terms of the first conductive layer/the second conductive layer, it is preferably 1000/1 to 1/1000, more preferably 100/1 to 1/100, still more preferably 5/1 to 1/15, even still more preferably 2/1 to 1/5, and most preferably 1/1 to 1/4. By selecting the ratio within the above range, the capability of blocking against lithium ions or an electrolyte liquid is sufficiently exhibited, thereby, it may contribute to the improvement of battery capacity. In particular, according to the embodiment in which the second conductive layer 3b is thicker than the first conductive layer 3a, the ability of blocking against lithium ions is more significantly exhibited, then, the reduction in battery capacity can be prevented with higher efficiency.

The upper limit of the volume resistance of the collector 3 is preferably $10^2$ Ω·cm or less from the viewpoint of battery performance. Meanwhile, the lower limit of the volume resistance of the collector 3 is preferably $10^{-5}$ Ω·cm or more, and more preferably $10^{-1}$ Ω·cm from the viewpoint of reliability against malfunction, i.e., suppressing current concentration at short circuit area when short circuit arises. The ratio of the volume resistance of the first conductive layer 3a (positive electrode side) and the volume resistance of the second conductive layer 3b (negative electrode side) of the collector 3 is, in terms of positive electrode side/negative electrode side, preferably 1/1000 to 1000/1 and more preferably 1/100 to 100/1. According to this embodiment, a capability of current collecting, which is the main function of the collector 3, is obtained at sufficient level, and therefore it may contribute to the improvement of battery capacity. Meanwhile, to obtain such volume resistance, the amount of a conductive filler or type of a conductive filler that is added to a base material (resin) for producing a conductive layer and dispersion state can be suitably adjusted. As used herein, the volume resistance (ratio) value is measured by the method described in the Examples given below.

Herein below, working effects of the collector 3 of the embodiment are described. In general, energy level of the highest occupied molecular orbital (HOMO) of the conductive layer that is arranged on the negative electrode side of a bipolar electrode increases by supply of electrons based on a negative electrode potential. Inventors found that, when the increased level is greater than the oxidation reduction potential of lithium ions in the electrolyte liquid, electron moves and it is accompanied with penetration of lithium ions into the inner portion of a resin collector.

According to the collector 3 of the embodiment, even when the energy level of the highest occupied molecular orbital (HOMO) of the second conductive layer 3b that is arranged on the negative electrode side of a bipolar electrode increases, the increased level is suppressed to be lower than the oxidation reduction potential of lithium ions in an electrolyte liquid. As a result, penetration and absorption of the lithium ions into the inner portion of a resin collector are prevented (i.e., lithium ion blocking is exhibited).

Until now, a method of providing a metal layer (i.e., a barrier layer) on part of the collector is suggested to achieve the lithium ion blocking in a resin collector. However, as the metal layer has a small resistance, when internal short circuit occurs inside the battery, the currents may be concentrated on an area having short-circuit to cause heat generation in the battery. Meanwhile, the conductive layer (3a and 3b) of the collector 3 of the embodiment has high resistance in the surface direction of the collector, and therefore a current cannot easily flow to an area having short circuit even when internal short circuit occurs inside the battery. As a result, heat generation in the battery is inhibited. Thus, compared to a conventional resin collector containing a metal layer, the collector 3 of the embodiment has also excellent reliability against malfunction.

[Positive Electrode Active Material Layer]

The positive electrode active material layer 5 contains a positive electrode active material. The positive electrode active material has a composition capable of absorbing ions during discharging and releasing ions during charging. Preferred examples thereof include lithium-transition metal composite oxides, which are composite oxides of a transition metal and lithium. Specific examples thereof include Li.Co based composite oxide such as $LiCoO_2$, Li.Ni based composite oxide such as $LiNiO_2$, Li.Mn based composite oxide such as spinel $LiMnO_2O_4$, Li.Fe based composite oxide such as $LiFeO_2$, and those obtained by replacing parts of transition metal elements of the lithium-transition metal composite oxides with other elements. The lithium-transition metal composite oxides are a non-expensive material with excellent reactivity and an excellent cycle property. Thus, by using the materials for an electrode, a battery with excellent output characteristics can be produced. Examples of the usable positive electrode active material other than those described above include lithium-transition metal phosphate compounds and lithium-transition metal sulfate compounds such as $LiFePO_4$; oxides or sulfides of a transition metal such as $V_2O_5$, $MnO_2$, $TiS_2$, $MoS_2$, and $MoO_3$; and $PbO_2$, AgO, and NiOOH. The positive electrode active material may be used either singly or in combination of two or more kinds thereof.

Average particle diameter of the positive electrode active material is, although not specifically limited, preferably 1 to 100 μm, and more preferably 1 to 20 μm from the viewpoint of obtaining high capacity, reactivity, and cycle durability of the positive electrode active material. When it is within this range, an increase in internal resistance of a battery during charging and discharging under high output condition is inhibited, thereby, a sufficient current can be generated. In addition, when the positive electrode active material is a secondary particle, the average particle diameter of a primary particle which constitutes the secondary particles is preferably in the range of 10 nm to 1 μm. However, according to the invention, it is not necessarily limited to the range. Although it may vary depending on production method, it is needless to say that the positive electrode active material which is not prepared as a secondary particle by aggregation or taking bulk shape can be also used. As for the particle diameter of the positive electrode active material and the particle diameter of the primary particle, a median radius measured by a laser diffraction method can be used. Shape of the positive electrode active material varies depending on the type, production method, or the like, and examples thereof include a globule shape (powder shape), a plate shape, a needle shape, a cylinder shape, and a cone shape, but not limited thereto. Any shape can be used without specific problem. Preferably, a shape most appropriate for an improved battery characteristic like a charging and discharging characteristic is selected.

[Negative Electrode Active Material Layer]

The negative electrode active material layer 7 contains a negative electrode active material. The negative electrode active material has a composition capable of releasing ions during discharging and absorbing ions during charging. The negative electrode active material is not specifically limited as long as it can reversibly absorb and release lithium. Examples of the negative electrode active material include a metal such as Si and Sn, metal oxide such as TiO, $Ti_2O_3$, $TiO_2$, $SiO_2$, SiO, and $SnO_2$, lithium-transition metal composite oxides such as $Li_{4/3}Ti_{5/3}O_4$ and $Li_7MnN$, Li—Pb based alloy, Li—Al based alloy, Li, and carbon materials such as natural graphite, artificial graphite, carbon black, active carbon, carbon fiber, cockes, soft carbon, and hard carbon. The negative electrode active material preferably contains an element which can form an alloy with lithium. By using an element which can form an alloy with lithium, the battery having high capacity and excellent output characteristics which also has higher energy density compared to existing carbon materials can be obtained. The negative electrode active material may be used either singly or in combination of two or more kinds thereof.

Specific examples of the element which can form an alloy with lithium include, although not specifically limited, Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te, and Cl. Of these, from the viewpoint of producing a battery with excellent capacity and energy density, it is preferable to include a carbon material and/or at least one element selected from a group consisting of Si, Ge, Sn, Pb, Al, In, and Zn. Particularly preferably, it includes a carbon material or an element of Si or Sn. It may be used either singly or in combination of two or more kinds thereof.

Average particle diameter of the negative electrode active material is, although not specifically limited, preferably 1 to 100 μm, and more preferably 1 to 20 μm from the viewpoint of obtaining high capacity, reactivity, and cycle durability of the negative e electrode active material. Within this range, an increase in internal resistance of a battery during charging and discharging under high output condition is inhibited thereby a sufficient current can be generated. When the negative electrode active material is a secondary particle, the average particle diameter of a primary particle which constitutes the secondary particles is preferably in the range of 10 nm to 1 μm. However, according to the invention, it is not necessarily limited to the range. Although it may vary depending on production method, it is needless to say that the negative electrode active material which is not prepared as a secondary particle by aggregation or taking bulk shape can be also used. As for the particle diameter of the negative electrode active material and the particle diameter of the primary particle, a median radius measured by a laser diffraction method can be used. Shape of the negative electrode active material varies depending on the type, production method, or the like, and examples thereof include a globule shape (powder shape), a plate shape, a needle shape, a cylinder shape, and a cone shape, but not limited thereto. Any shape can be used without specific problem. Preferably, a shape most appropriate for obtaining an improved battery characteristic like a charging and discharging characteristic is selected.

If necessary, the active material layers (5 and 7) may contain an additional material. Examples thereof include a conductive auxiliary agent and a binder. Further, when an ion conductive polymer is contained therein, a polymerization initiator for polymerization of the polymer may be included.

The conductive auxiliary agent is an additive which is added to improve the conductivity of the active material layer.

Examples of the conductive auxiliary agent include acetylene black, carbon black, Ketjen Black, carbon powder such as graphite, various carbon fibers such as vapor grown carbon fiber (VGCF; registered trademark), and expanded graphite. However, it is needless to say that the conductive auxiliary agent is not limited to them.

Examples of the binder include polyfluorovinylidene (PVdF), PI, PTFE, SBR, and synthetic rubber based binder. However, it is needless to say that the binder is not limited to them. When the binder and the matrix polymer that is used as a gel electrolyte are identical to each other, there is no need to use a binder.

The addition ratio of the components that are included in the active material layer is not specifically limited. The addition ratio can be suitably adjusted according to common knowledge regarding a lithium ion secondary battery. Thickness of the active material layer is not specifically limited, either. It can be also suitably adjusted according to common knowledge regarding a lithium ion secondary battery. For example, the thickness of the active material layer is 10 to 100 μm or so and more preferably 20 to 50 μm. When the thickness of the active material layer is 10 μm or more, the battery capacity can be maintained at sufficient level. Meanwhile, when the thickness of the active material layer is 100 μm or less, a problem of increased internal resistance which is accompanied with reduced diffusion of $Li^+$ to a deep portion of electrode (i.e., collector side) can be prevented.

Method to form a positive electrode active material layer (or a negative electrode active material layer) on a surface of a collector is not specifically limited, and any known method can be also used. For example, a positive electrode active material (or a negative electrode active material), and if necessary, an electrolyte salt to increase ion conductivity, a conductive auxiliary agent to increase electron conductivity, and a binder are dispersed and dissolved in an appropriate solvent to prepare a positive electrode active material slurry (or a negative electrode active material slurry). After coating the slurry on a collector, the solvent is removed by drying. Then, by pressing, a positive electrode active material layer (or a negative electrode active material layer) is formed on a collector. In such case, examples of the solvent that can be used include, although not specifically limited, N-methyl-2-pyrrolidone (NMP), dimethyl formamide, dimethyl acetamide, methyl formamide, cyclohexane, hexane, and water. When polyfluorovinylidene (PVdF) is used as a binder, it is preferable to use NMP as a solvent.

According to the above method, the positive electrode active material slurry (or negative electrode active material slurry) is coated on a collector and dried followed by pressing. By controlling the condition for pressing, porosity of the positive electrode active material layer (or negative electrode active material layer) can be controlled.

Specific method or condition for the press treatment is not specifically limited. It can be suitably controlled such that the desired porosity value of the positive electrode active material layer (or negative electrode active material layer) is obtained after the press treatment. Specific mode of the press treatment includes, for example, use of a hot press machine or a calender roll press machine. The press condition (temperature, pressure, or the like) is not specifically limited either, and it can be referenced from conventional knowledge.

According to the bipolar electrode 1 of the embodiment, the energy level of the highest occupied molecular orbital (HOMO) of the second conductive layer 3b, which is arranged on the negative electrode side of the bipolar electrode, is suppressed to be lower than the oxidation reduction potential of lithium ions in an electrolyte liquid even when it is increased by the negative electrode potential. As a result, penetration and absorption of the lithium ions into the inner portion of a resin collector are prevented (i.e., the lithium ion blocking is exhibited).

<Bipolar Secondary Battery>

Figure 2:
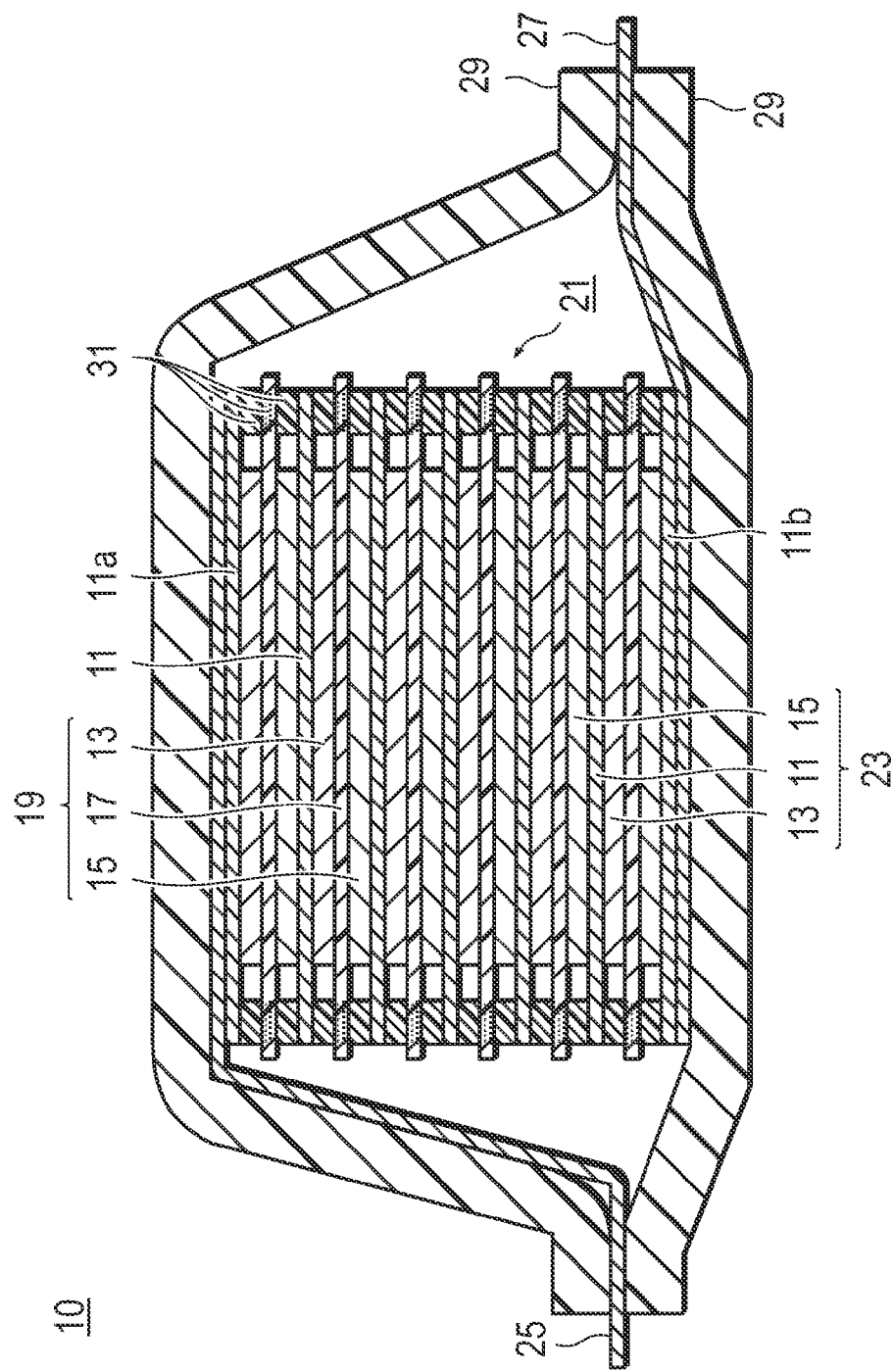
FIG. 2 is a cross-sectional view schematically illustrating the bipolar lithium ion secondary battery according to an embodiment of the invention.

FIG. 2 is a schematic cross-sectional view illustrating the overall structure of bipolar secondary battery according to the one embodiment of the present invention. Bipolar lithium ion secondary battery 10 of the present embodiment as illustrated in FIG. 2 has substantially rectangular electric power generating element 21, which actually performs a charge/discharge reaction therein, sealed in a battery package of laminate film 29.

As illustrated in FIG. 2, electric power generating element 21 of bipolar secondary battery 10 according to the embodiment includes plural bipolar electrodes 23 each having collector 11, positive electrode active material layer 13 electrically connected to one side of collector 11 and negative electrode active material layer 15 electrically connected to the other side of collector 11. These bipolar electrodes 23 are laminated together with intervened by electrolyte layers 17, thereby constituting electric power generating element 21. Electrolyte layers 17 have a configuration in which the electrolyte is retained in the planar center of the separator as a base, respectively. Bipolar electrodes 23 and electrolyte layers 17 are alternately laminated on each other in such a manner that positive electrode active material layer 13 of either one of bipolar electrodes 23 faces negative electrode active material layer 15 of any other one of bipolar electrodes 23 adjacent to the aforementioned either one of bipolar electrodes 23 with intervened by electrolyte layer 17. Namely, electrolyte layer 17 is arranged to be sandwiched between positive electrode active material layer 13 of the either one of bipolar electrodes 23 and negative electrode active material layer 15 of the any other one of bipolar electrodes 23 adjacent to the aforementioned either one of bipolar electrodes 23.

These adjacently located positive electrode active material layer 13, electrolyte layer 17, and negative electrode active material layer 15 constitute single unit cell layer 19. It can be thus said that bipolar secondary battery 10 has a laminated structure of unit cell layers 19. For the purpose of preventing liquid junction caused by leakage of an electrolyte liquid from electrolyte layer 17, seal member (insulating layer) 31 is arranged on the peripheries of unit cell layer 19. Outermost collector 11a which locates at the outermost layer of electric power generating element 21 of the positive electrode side, and positive electrode active material layer 13 is formed only on one side of the outermost collector 11a. Outermost collector 11b, which locates at the outermost layer of electric power generating element 21 of the negative electrode side, and negative electrode active material layer 15 is formed only on one side of the outermost collector 11b.

Bipolar secondary battery 10 illustrated in FIG. 2 also has a positive electrode collector plate 25 located adjacent to positive-electrode-side outermost collector 11a and led out from laminate film 29. A negative electrode collector plate 27 located adjacent to negative-electrode-side outermost collector 11b and led out from laminate film 29.

In bipolar secondary battery 10 illustrated in FIG. 2, seal member 31 is arranged at outer peripheries of unit cell layers 19 so as to prevent a contact between adjacent collectors 11 in battery and short circuit due to slight variations of ends of unit cell layers 19 in electric power generating element 21. Such seal member 31 arranged makes it possible that the bipolar secondary battery 10 can securely have long-term reliability and safety and achieve high quality.

Herein, the number of laminated unit cell layers 19 is adjusted depending on the desired battery voltage. The number of laminated unit cell layer 19 can be decreased as long as bipolar secondary battery 10 can secure a sufficient output even with an extremely thin bipolar secondary battery 10. In bipolar secondary battery 10, electric power generating element 21 is preferably vacuum-sealed in the battery package of laminate film 29, with positive and negative electrode collector plates 25 and 27 led out of laminate film 29, in order to protect electric power generating element 21 from external impact and environmental deterioration during use. The main structural parts of the bipolar secondary battery according to this embodiment will be described in greater detail below.

[Electrolyte Layer]

An electrolyte to form the electrolyte layer is not limited to a specific electrolyte. A liquid electrolyte or a polymer electrolyte such as a polymer gel electrolyte and a polymer solid electrolyte can be suitably used.

The liquid electrolyte contains a lithium salt as a supporting salt dissolved in a solvent. Examples of the solvent include dimethyl carbonate (DMC), diethyl carbonate (DEC), dipropyl carbonate (DPC), ethyl methyl carbonate (EMC), methyl propionate (MP), methyl acetate (MA), methyl formate (MF), 4-methyl dioxolane (4MeDOL), dioxolane (DOL), 2-methyl tetrahydrofuran (2MeTHF), tetrahydrofuran (THF), dimethoxyethane (DME), ethylene carbonate (EC), propylene carbonate (PC), butyrene carbonate (BC), and γ-butyrolactone (GBL). The solvent may be used either singly or in combination of two or more kinds thereof.

Examples of the supporting salt (lithium salt) include, although not specifically limited, an anionic salt of inorganic acid such as $LiPF_6$, $LiBF_4$, $LiClO_4$, $LiAsF_6$, $LiTaF_6$, $LiSbF_6$, $LiAlCl_4$, $Li_2B_{10}Cl_{10}$, LiI, LiBr, LiCl, LiAlCl, $LiHF_2$, and LiSCN, and an anionic salt of organic acid such as $LiCF_3SO_3$, $Li(CF_3SO_2)_2N$, lithium bisoxide borate (LiBOB), and lithium bis(perfluoroethylene sulfonylimide) (LiBETI); also described as $Li(C_2F_5SO_2)_2N$. The electrolyte salt may be used either singly or in combination of two or more kinds thereof.

Meanwhile, the polymer electrolyte can be classified into a gel electrolyte containing an electrolyte liquid, and a polymer solid electrolyte containing no electrolyte liquid. The gel electrolyte has a constitution in which the above liquid electrolyte is injected into a matrix polymer having $Li^+$ conductivity. Examples of matrix polymer having $Li^+$ conductivity include a polymer having polyethylene oxide as a main chain or a side chain (PEO), a polymer having polypropylene oxide as a main chain or a side chain (PPO), polyethylene glycol (PEG), polyacrylonitrile (PAN), polymethacylic acid ester, polyfluorovinylidene (PVdF), copolymer of polyfluorovinylidene and hexafluoropropylene (PVdF-HFP), polyacrylonitrile (PAN), poly(methyl acrylate) (PMA), and poly(methyl methacrylate) (PMMA). A mixture, a modified product, a derivative, a random copolymer, an alternating copolymer, a graft copolymer, and a block copolymer of the above polymers can be also used. Of these, it is preferable to use PEO, PPO, their copolymer, PVdF, or PVdF-HFP. In these matrix polymers, an electrolyte salt such as lithium salt can be dissolved well.

When the electrolyte layer is constituted with a liquid electrolyte or a gel electrolyte, a separator may be used in an electrolyte layer. Specific examples of the separator include a microporous membrane made of polyolefin such as polyethylene and polypropylene, hydrocarbons such as polyfluorovinylidene-hexafluoropropylene (PVdF-HFP), or glass fibers.

The polymer solid electrolyte has a constitution that the support salt (lithium salt) is dissolved in the above matrix polymer, without containing an organic solvent as a plasticizer. Thus, when the electrolyte layer consists of such polymer solid electrolyte, an improvement in the battery reliability can be obtained with no fear of having liquid leakage from the battery.

The matrix polymer of the gel polymer electrolyte or polymer solid electrolyte can exhibit good mechanical strength by formation of a cross-linking structure. In order to form such a cross-linking structure, a polymerizable material (such as PEO or PPO) to form the polymer electrolyte is polymerized by any polymerization reaction such as thermal polymerization, ultraviolet polymerization, radiation induced polymerization, or electron-beam induced polymerization with the use of any appropriate polymerization initiator. The electrolyte may be contained in an active material layer of an electrode.

[Seal Member]

Seal member (i.e., insulating layer) has a function of preventing contact between collectors or short circuit at an end of unit cell layer. The seal member can be of any material having insulation property, sealing ability against loss of the solid electrolyte material, and sealing ability (hermeticity) against moisture permeation from the outside as well as heat resistance under battery operation temperature conditions. Examples of such a material include a urethane resin, an epoxy resin, a polyethylene resin, a polypropylene resin, a polyimide resin, and a rubber material. Of these, the polyethylene resin and the polypropylene resin are preferred as the material of seal member, in terms of corrosion resistance, chemical resistance, easiness of formation (capability of film formation), cost efficiency, and the like.

[Battery Package]

A conventionally known metal can case can be used as a battery package. A bag-shaped case which is made by a laminate film containing aluminum can be also used to cover electric power generating element. As a laminate film, a laminate film having a trilayer structure in which a polypropylene layer, an aluminum layer, and a nylon layer are laminated in this order can be used, but not specifically limited. In the present embodiment, a laminate film is preferable as it has high output and cooling characteristics and high applicability to large-equipment batteries such as EV and HEV batteries.

According to bipolar secondary battery 10 of the present embodiment, even when energy level of the highest occupied molecular orbital (HOMO) of second conductive layer 3b that is arranged on a negative electrode side of a bipolar electrode increases by negative electrode potential, the increased level is suppressed to be lower than the oxidation reduction potential of lithium ions in an electrolyte liquid. As a result, penetration and absorption of the lithium ions into the inner portion of a resin collector are prevented (i.e., the lithium ion blocking is exhibited). Because the penetration and absorption of lithium ions into the inner portion of the resin collector are prevented, the liquid junction between active material layers or accompanying reduction in battery capacity can be also suppressed.

EXAMPLES

The working effects of the invention are described in view of the Examples and the Comparative examples given below. However, it is evident that the technical scope of the invention is not limited to the following Examples.

Example 1

Production of Collector

A conductive resin film consisting of a mixture in which 10% by mass of Ketjen Black was mixed with 100% by mass of polyimide (PI) was prepared as the first conductive layer (film thickness: 25 μm).

Meanwhile, to 100% by mass of molten ethylene-vinyl alcohol copolymer (ethylene composition: 38 mol %) (EVOH), 10% by mass of Ketjen Black was added, and a conductive resin film (film thickness: 25 μm) was produced as the second conductive layer by extrusion method.

The first conductive layer and the second conductive layer that were prepared and produced above were overlaid to each other and subjected to heat sealing at 160° C. for 10 min to produce a collector for a bipolar lithium ion secondary battery having a two-layer structure.

<Production of Bipolar Electrode>

Meanwhile, a positive electrode active material slurry was prepared by mixing 85% by mass of $LiMn_2O_4$ as a positive electrode active material, 5% by mass of acetylene black as a conductive auxiliary agent, 10% by mass of polyfluorovinylidene (PVDF) as a binder, and an appropriate amount of N-methyl-2-pyrrolidone (NMP) as a solvent for controlling viscosity of the slurry.

A negative electrode active material slurry was prepared by mixing 90% by mass of hard carbon as a negative electrode active material, 5% by mass of acetylene black as a conductive auxiliary agent, 10% by mass of PVDF as a binder, and an appropriate amount of NMP as a solvent for controlling viscosity of the slurry.

The positive electrode material slurry obtained above was coated on the first conductive layer side surface of the collector manufactured above and dried to form a coated film. To arrange a seal member (described below), the peripheries of the collector were remained exposed. Then, the coated film obtained was pressed to form a positive electrode active material layer (thickness: 36 μm).

Similar to above, the negative electrode material slurry obtained above was coated on the second conductive layer side surface of the collector manufactured above and dried to form a coated film. To arrange a seal member (described below), the peripheries of the collector were remained exposed. Then, the coated film obtained was pressed to form a negative electrode active material layer (thickness: 30 μm).

An electrolyte liquid was prepared by mixing 1 mol/L $LiPF_6$ as lithium salt in propylene carbonate.ethylene carbonate (1:1 volume ratio) mixture solution with equal volume of each, as an electrolyte liquid. Thereafter, to 90% by mass of the resulting electrolyte liquid, 10% by mass of a polyvinylidene fluoride-hexafluoropropylene (PVDF-HFP) copolymer containing 10 mol % of hexafluoropropylene comonomer as a host polymer, and an appropriate amount of dimethyl carbonate (DMC) as a viscosity adjusting solvent were added and mixed therein to produce an electrolyte material.

The electrolyte material prepared from above was applied to both surfaces of the positive electrode active material layer and the negative electrode active material layer of the bipolar electrode, followed by drying at 100° C. The bipolar electrode was thus completed with the gel electrolyte material impregnated in the active material layers.

<Production of Bipolar Secondary Battery>

The electrolyte material prepared from above was applied to the surface of the positive electrode active material layer of the bipolar electrode, followed by drying at 100° C. As a result, a gel electrolyte layer was formed. Meanwhile, sealing members having width of 12 mm were arranged on exposed portions (peripheries) on the surface of the first conductive layer side of the collector. This process was repeated to obtain a laminate in which six bipolar electrodes were laminated with intervened by a gel electrolyte layer. Subsequently, the resulting laminate was subjected to a hot press treatment (0.2 MPa, 80° C., 5 sec) in the lamination direction for heat sealing of seal members to seal adjacent bipolar electrodes. As a result, an electric power generating element was completed.

A power supply terminal which had an aluminum plate (thickness: 100 μm) having a size of 130 mm×80 mm, with a portion thereof extending to the outside of the horizontal surface of the electric power generating element, was prepared to cover the whole of a reflected surface of the electric power generating element. The electric power generating element was sandwiched between the power supply terminals, and then, enclosed and vacuum-sealed in a battery package of aluminum laminate film. Consequently, the entire electric power generating element was pressurized from both sides by atmospheric pressure so as to increase contact between the electric power generating element and the power supply terminal. As a result, a laminate structure was obtained.

The above-obtained laminate structure was subjected to hot pressing (surface pressure: 1 kg/cm$^2$, 150° C., and for 1 hour), so as to cure the uncured seal member. As a result, the bipolar secondary battery was completed.

Example 2

A bipolar secondary battery was manufactured in the same manner as the Example 1, except that the addition amount of Ketjen Black was changed to 5% by mass with respect to 100% by mass of EVOH for producing the second conductive layer.

Example 3

A bipolar secondary battery was manufactured in the same manner as the Example 1, except that the first conductive layer having film thickness of 12.5 μm was used and the second conductive layer was produced to have film thickness of 37.5 μm.

Example 4

A bipolar secondary battery was manufactured in the same manner as the Example 1, except that the first conductive layer having film thickness of 37.5 μm was used and the second conductive layer was produced to have film thickness of 12.5 μm.

Example 5

A bipolar secondary battery was manufactured in the same manner as the Example 1, except that Nylon 12 (PA12) was used instead of EVOH and the temperature for heat sealing was change to 170° C. for producing the second conductive layer.

Example 6

A bipolar secondary battery was manufactured in the same manner as the Example 5, except that the addition amount of Ketjen Black was changed to 7% by mass compared to 100% by mass of PA12 for producing the second conductive layer.

Example 7

A bipolar secondary battery was manufactured in the same manner as the Example 1, except that polyphenylene sulfide (PPS) was used instead of EVOH and the temperature for heat sealing was change to 250° C. for producing the second conductive layer.

Example 8

A bipolar secondary battery was manufactured in the same manner as the Example 1, except that tetrafluoroethylene-hexafluoropropylene copolymer (FEP) was used instead of EVOH and the temperature for heat sealing was change to 250° C. for producing the second conductive layer.

Example 9

A bipolar secondary battery was manufactured in the same manner as the Example 1, except that tetrafluoroethylene-perfluoroalkylvinyl ether copolymer (PFA) was used instead of EVOH for producing the second conductive layer.

Comparative Example 1

A bipolar secondary battery was manufactured in the same manner as the Example 1, except that polytetrafluoroethylene (PTFE) was used instead of EVOH for producing the second conductive layer. PTFE is a polymer having no imide group and also no polar group.

Comparative Example 2

A bipolar secondary battery was manufactured in the same manner as the Example 9, except that the negative electrode active material layer was formed on the first conductive layer side surface of the collector and the positive electrode active material layer was formed on the second conductive layer side surface of the collector.

Comparative Example 3

A bipolar secondary battery was manufactured in the same manner as the Example 1, except that a conductive resin film (film thickness: 50 μm) in which 10% by mass of Ketjen Black was mixed with 100% by mass of polyimide (PI) was used as a collector. Since the collector used in this comparative example was a monolayer, there was no distinction between the positive electrode side and the negative electrode side.

<Measurement of Charging and Discharging Efficiency>

Each of the bipolar secondary batteries produced above was charged to 21.0 V by a constant current (CC) of 0.5 mA under 25° C. atmosphere and then further charged with a constant voltage (CV). The total charge time was 10 hours. The durability of the battery was tested by capacity measurements after 50 test cycles of charging and discharging at a discharge capacity of 1 C. The capacity retention ratio (%) refers to the ratio of the discharge capacity after completing the durability test with respect to the initial discharge capacity. The results are given in the following Table 1.

<Measurement of Volume Resistivity>

Each of the collectors used in each example and comparative example described above was tested for volume resistivity according to the following method. First, the collector was cut to have a size of 5 cm×8 cm. Surface resistance was measured for nine spots in the surface by using 4-point probe (trade name: LORESTA-EP, product number: MCP-T360, manufactured by Mitsubishi Chemical Corporation). The measurement value was normalized in terms of film thickness and volume resistivity (Ω·cm) was calculated. The volume resistivity was measured in the same manner as above for each of the positive electrode side and the negative electrode side, and the ratio of volume resistivity was calculated. The results are given in the following Example 1.

TABLE 1

| | Positive electrode side | Negative electrode side | Volume resistivity [Ω · cm] | Volume resistivity ratio Positive electrode side/ Negative electrode side | Film thickness [μm] | Film thickness ratio Positive electrode side/ Negative electrode side | Capacity retention ratio [%] |
|---|---|---|---|---|---|---|---|
| Example 1 | PI | EVOH | 1 | 1/1 | 50 | 1/1 | 88 |
| Example 2 | PI | EVOH | 80 | 1/80 | 50 | 1/1 | 76 |
| Example 3 | PI | EVOH | 1 | 1/1 | 50 | 1/3 | 89 |
| Example 4 | PI | EVOH | 1 | 1/1 | 50 | 3/1 | 78 |
| Example 5 | PI | PA12 | 1 | 1/1 | 50 | 1/1 | 85 |
| Example 6 | PI | PA12 | 20 | 1/20 | 50 | 1/1 | 76 |
| Example 7 | PI | PPS | 1 | 1/1 | 50 | 1/1 | 85 |
| Example 8 | PI | FEP | 1 | 1/1 | 50 | 1/1 | 83 |
| Example 9 | PI | PFA | 1 | 1/1 | 50 | 1/1 | 74 |
| Comparative example 1 | PI | PTFE | 1 | 1/1 | 50 | 1/1 | 34 |
| Comparative example 2 | PFA | PI | 1 | 1/1 | 50 | 1/1 | 25 |
| Comparative example 3 | | PI | 1 | — | 50 | — | 15 |

From the results that are given in the Table 1, it was found that the capacity retention ratio is significantly improved in every Examples (the conductive layer (resin layer) in which a polar resin containing no imide group was used was arranged on the negative electrode side) compared to the Comparative examples. The mechanism for exhibition of the effects by having the constitution above is considered to be as follows. Specifically, even when energy level of the highest occupied molecular orbital (HOMO) of the conductive layer increases by negative electrode potential, the increased level is suppressed to be lower than the oxidation reduction potential of lithium ions in an electrolyte liquid. As a result, penetration and absorption of the lithium ions into the inner portion of a resin collector are prevented then reduction in capacity is suppressed.

About the film thickness ratio of the positive electrode side and the negative electrode side, it was found from the results of the Example 1, 3, and 4 that smaller film thickness ratio (i.e., the thicker second conductive layer compared to the first conductive layer) can more significantly suppress the reduction in capacity retention ratio. This is believed that, by increasing the thickness of the second conductive layer, the capability of lithium ion blocking is further improved. In addition, it was also shown from the results of the Examples 1 and 2 or the Examples 5 and 6 that, when the volume resistivity of the first conductive layer was maintained at constant level, the smaller volume resistivity of the second conductive layer could suppress more efficiently the reduction in capacity retention ratio.

EXPLANATION OF SYMBOLS AND NUMERALS 1, 23 Bipolar electrode,
3, 11 Collector,
3a First conductive layer,
3b Second conductive layer,
5, 13 Positive electrode active material layer,
7, 15 Negative electrode active material layer,
10 Bipolar secondary battery,
11a Outermost collector on positive electrode side,
11b Outermost collector on negative electrode side,
17 Electrolyte layer,
19 Unit cell layer,
21 Electric power generating element,
25 Positive electrode collector plate,
27 Negative electrode collector plate,
29 Laminate film,
31 Seal member.

The invention claimed is:

1. A collector for a bipolar lithium ion secondary battery comprising:
   a first conductive layer that is configured by adding a conductive filler into a base material that contains an imide group-containing resin; and
   a second conductive layer that is configured by adding a conductive filler into a base material that contains a polar resin containing no imide group,
   wherein the first conductive layer is arranged on a positive electrode side.

2. The collector for a bipolar lithium ion secondary battery according to claim 1, wherein the secondary conductive layer is thicker than the first conductive layer.

3. The collector for a bipolar lithium ion secondary battery according to claim 1, wherein the resin containing no imide group is crystalline.

4. An electrode for a bipolar lithium ion secondary battery comprising:
   the collector according to claim 1;
   a positive electrode active material layer formed on the first conductive layer side surface of the collector; and
   a negative electrode active material layer formed on the second conductive layer side surface of the collector.

5. A bipolar lithium ion secondary battery comprising an electric power generating element in which the electrode described in claim 4 and an electrolyte layer are laminated.

6. The collector for a bipolar lithium ion secondary battery according to claim 2, wherein the resin containing no imide group is crystalline.

\* \* \* \* \*